(12) United States Patent
Desbiens et al.

(10) Patent No.: US 8,885,993 B2
(45) Date of Patent: Nov. 11, 2014

(54) DUAL-INDEX OPTICAL PUMP STRIPPER ASSEMBLY

(71) Applicant: Institut National d'Optique, Quebec (CA)

(72) Inventors: Louis Desbiens, St-Augustin-de-Desmaures (CA); Pierre Laperle, St-Augustin-de-Desmaures (CA)

(73) Assignee: Institut National d'Optique, Quebec, Quebec (CA)

( * ) Notice: Subject to any disclaimer, the term of this patent is extended or adjusted under 35 U.S.C. 154(b) by 125 days.

(21) Appl. No.: 13/799,873

(22) Filed: Mar. 13, 2013

(65) Prior Publication Data

US 2014/0270637 A1 Sep. 18, 2014

(51) Int. Cl.
*G02B 6/42* (2006.01)
*G02B 6/028* (2006.01)

(52) U.S. Cl.
CPC ..................... *G02B 6/0288* (2013.01)
USPC ......................................................... 385/29

(58) Field of Classification Search
None
See application file for complete search history.

(56) References Cited

U.S. PATENT DOCUMENTS

| | | | |
|---|---|---|---|
| 7,373,070 B2 | 5/2008 | Wetter et al. | |
| 7,839,901 B2 | 11/2010 | Meleshkevich et al. | |
| 8,027,555 B1* | 9/2011 | Kliner et al. | 385/29 |
| 2011/0110625 A1 | 5/2011 | Chatigny | |

OTHER PUBLICATIONS

Alexandre Wetter et al., High power cladding light strippers, 2008, 8 pages, Proc. of SPIE vol. 6873 687327-8.

* cited by examiner

*Primary Examiner* — Uyen Chau N Le
*Assistant Examiner* — Hoang Tran
(74) *Attorney, Agent, or Firm* — Merchant & Gould P.C.

(57) ABSTRACT

A light stripper assembly for dissipating a residual optical pump power carried by a pump light propagating in an optical fiber component is provided. The optical fiber component includes a pump cladding surrounded by an outer cladding, the outer cladding being removed from the optical fiber component along a lengthwise segment thereof. The light stripper assembly includes a pump stripper disposed about the lengthwise segment and a heat-dissipation packaging structure thermally contacting the pump stripper. The pump stripper includes an input guiding region and a stripping region having refractive indices lower and higher than the refractive index at the outermost periphery of the pump cladding, respectively, so that the pump light is at least partially guided inside the pump cladding along the input guiding region and stripped from the pump cladding along the stripping region. The heat-dissipation packaging structure absorbs and dissipates the residual power stripped by the stripping region.

13 Claims, 8 Drawing Sheets

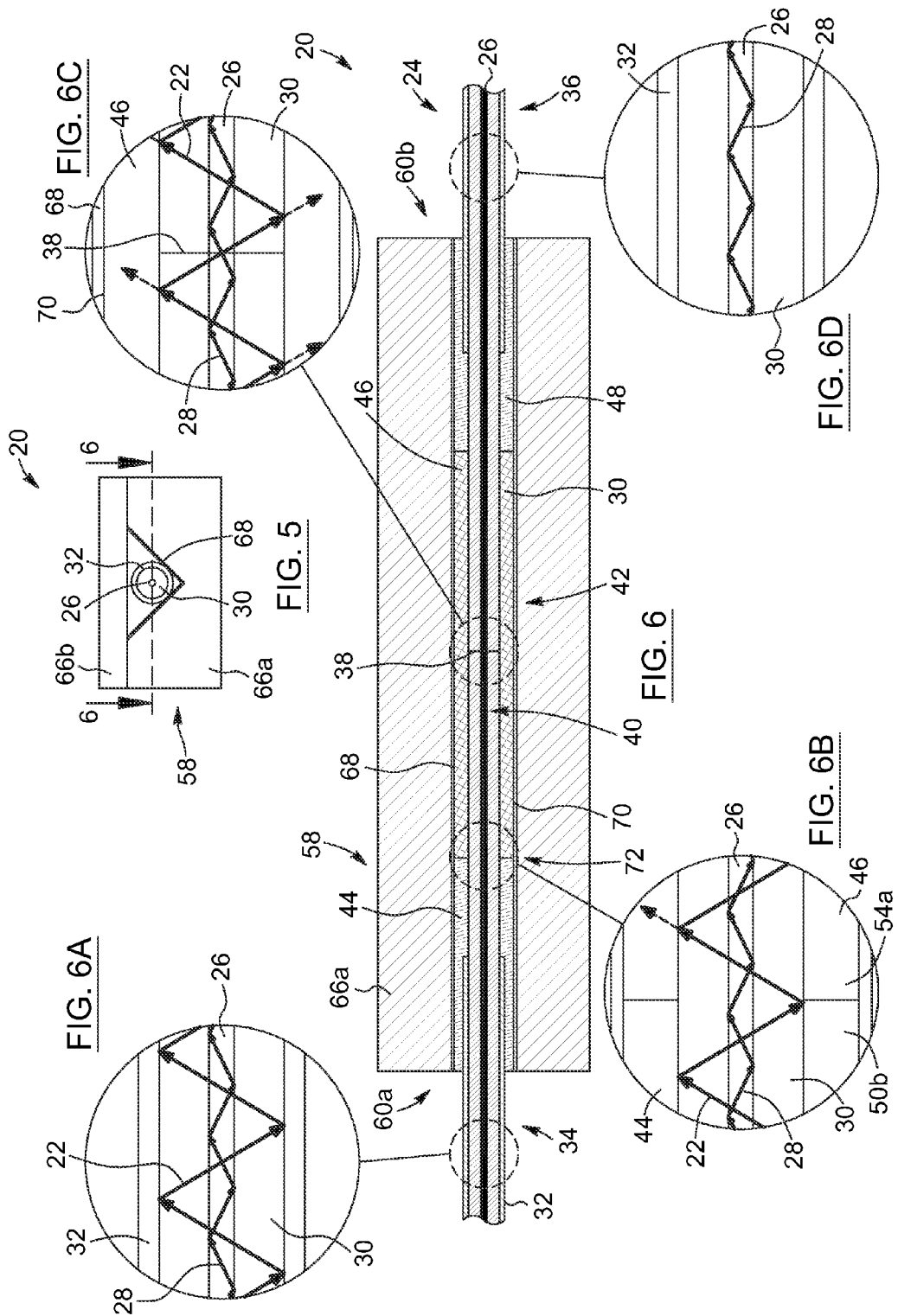

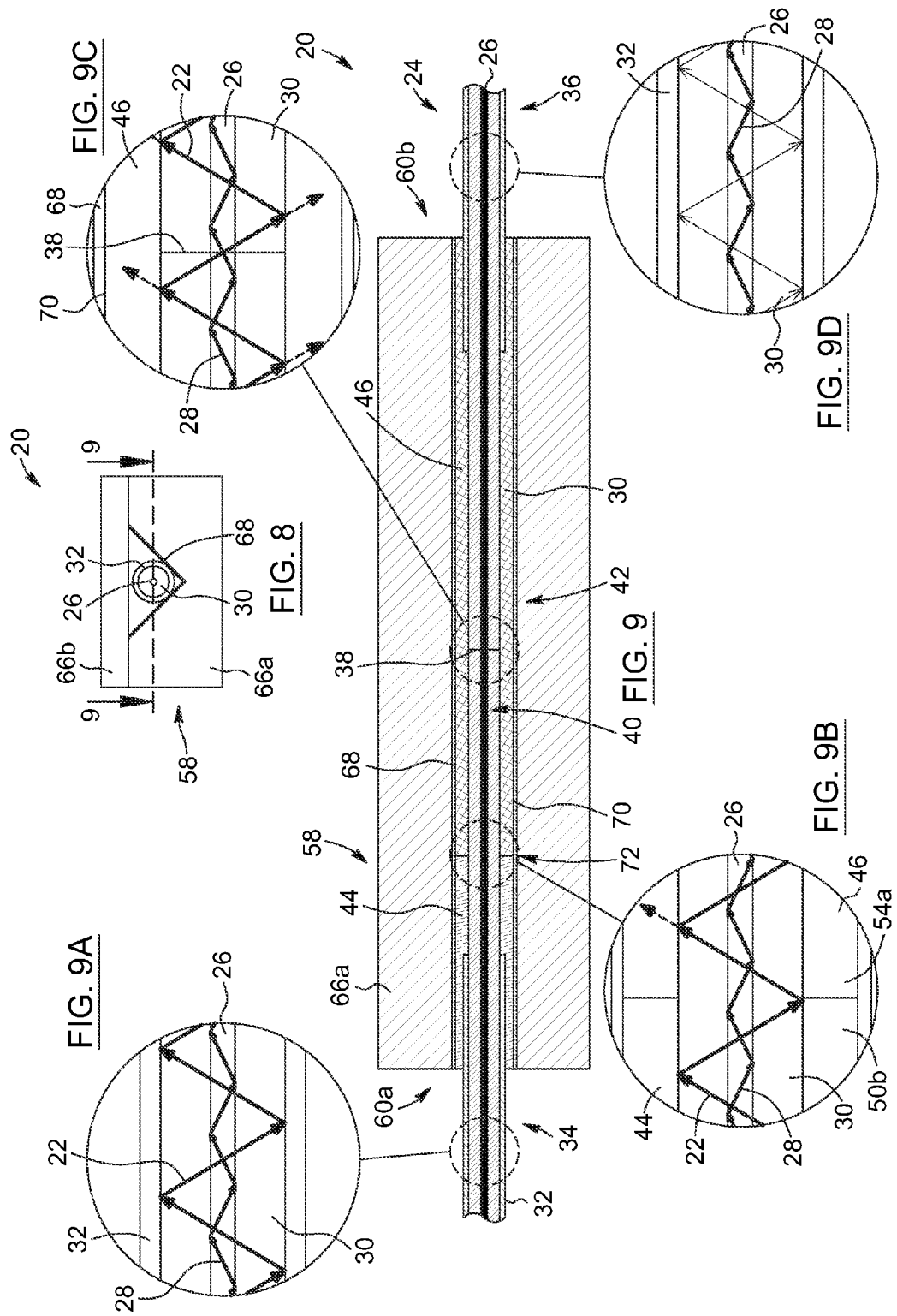

DUAL-INDEX OPTICAL PUMP STRIPPER ASSEMBLY

FIELD OF THE INVENTION

The present invention relates to the field of optical fiber components, and more particularly concerns a light stripper assembly for dissipating a residual optical pump power carried by a pump light propagating in an optical fiber component.

BACKGROUND OF THE INVENTION

Cladding-pumped fiber devices, such as fiber lasers and amplifiers, are used in a wide range of optical applications in fields such as medicine and surgery, scientific instrumentation, semiconductor device manufacturing, military technology, and industrial material processing. Cladding-pumped fiber lasers and amplifiers can provide high-power and high-quality laser beams and can be implemented in compact, reliable and cost-effective fiber lasers and amplifiers.

Cladding-pumped optical fibers, such as double-clad optical fibers, generally include a core that carries the light signal, a pump or inner cladding surrounding the core and carrying the pump light, and an outer cladding surrounding the pump cladding. The core, pump cladding and outer cladding are made of materials with different refractive indices, such that the index of the core is higher than that of the pump cladding, which, in turn, is higher than the index of the outer cladding. Both core and pump cladding are typically made of silica glass ($SiO_2$). In the gain region thereof, the core is doped with a laser-active dopant material, for example a rare earth such as ytterbium (Yb), erbium (Er) or thulium (Tm). The pump cladding has a large cross-sectional area as compared to the core and high numerical aperture. The outer cladding confines the pump light inside the pump cladding and is commonly made of a low-index polymer rather than glass.

Advantageously, cladding-pumped fibers allow generating a high-brightness and high-quality light signal using low-brightness and low-quality optical pump light. This allows laser diodes to be used as optical pump sources even though they emit high-power laser beams of low brightness. For example, currently-available high-power laser diodes emitting at pump wavelengths in the range from 915 to 980 nanometers (nm) can readily be used for optically pumping rare-earth-doped fiber lasers. The pump light can easily be coupled into the pump cladding due to its large cross-sectional area and high numerical aperture while the light signal propagates in the core. This pumping method is often referred to as "cladding pumping" as opposed to the more conventional "core pumping", in which the pump light is coupled into the core. Using cladding pumping, fiber lasers can emit laser beams carrying several kilowatts of optical power along with a near diffraction-limited beam quality.

As fiber lasers and amplifiers have been evolving toward higher optical power levels and pulse energies, much attention has been devoted to their reliability, including thermal robustness, optical efficiency and power handling capabilities. A significant parameter affecting their reliability at high optical power levels is the coupling and conversion efficiencies of the pump light in the amplification process. Indeed, when scaling to higher output powers, dissipating or otherwise managing the residual pump power that could not be absorbed in the gain medium becomes important. For example, high-power pump diodes emitting in the 915-980 nm wavelength range can generate significant residual pump power. If not properly stripped or radiated away from the pump cladding, this residual pump power may deteriorate the quality of the light signal as well as the integrity of the optical elements disposed downstream of the active region.

The problem discussed above of stripping residual pump power from the pump cladding of cladding-pumped optical fibers has been considered, for example in U.S. Pat. Nos. 7,373,070 and 7,839,901, in U.S. Patent Application Publication No. 2011/0110625, and in Wetter et al., "High power cladding light strippers", Proc. of SPIE vol. 6873, p. 687327, (2008).

It is known in the art that pump stripping in a cladding-pumped optical fiber may be achieved first by removing, along a lengthwise segment of the optical fiber, the low-index outer cladding, thereby exposing the inner pump cladding. This lengthwise segment may then be recoated with a transparent coating having a refractive index higher than that of the pump cladding, the high-index coating thus acting as a pump stripper that couples the pump light out of the pump cladding. The extraction length and the magnitude of the dissipated pump power are functions, among other factors, of the difference between the refractive indices of the pump cladding and the high-index coating, and on the way this difference varies with temperature.

U.S. Pat. No. 7,839,901 discloses a lightguide including a light stripper and a fiber having a core and an inner cladding guiding respective light signals. The light stripper includes a coating upon the inner cladding, where the refractive index of the coating is greater than that of the inner cladding. In addition, the refractive index of the coating is selected so that the heat generated upon removal of substantially the entire light from the inner cladding is insufficient to cause a critical temperature rise that would damage the coating. It is mentioned that the refractive index of the coating may be uniform along the entire stripping region of the inner cladding, but that it may alternatively be varied. For example, in one embodiment, the coating may be configured with a succession of sub-regions having respective refractive indices, which differ from one another while remaining higher than the refractive index of the inner cladding.

Wetter et al. in "High power cladding light strippers", Proc. of SPIE vol. 6873, p. 687327 (2008) also disclose that light stripping in a double-clad fiber can be achieved by recoating the double-clad fiber with a high-index coating. More specifically, they disclose that a homogeneous high-index polymer cannot be used over the entire length of the stripping region in order to minimize localized heating caused by stripping too close to the input end of the stripping region. Rather, a high-index polymer which would gradually strip the light would be ideal to spread the heat load uniformly along the stripper length. Furthermore, it is disclosed that the refractive index of the high-index polymer should increase along the length of the stripper to gradually strip the pump light. They mention that different methods can be used in order to tend toward this situation, such as applying different polymers having different indices at different locations.

In the pump stripping arrangements disclosed in U.S. Pat. No. 7,839,901 and in Wetter et al., varying the value of the refractive index of the high-index outer cladding disposed over a lengthwise segment of the pump cladding upon removal of the original low-index outer cladding therefrom helps ensuring that the pump light is is uniformly stripped along the length of the pump stripper, resulting in a more uniform heat distribution.

The high-index outer cladding of the pump stripping arrangements discussed in the preceding paragraph remains in contact with the low-index outer cladding at the ends of the lengthwise segment. As a result, localized stripping occurring near the junction between the low and high-index outer claddings can cause heating of the low-index outer cladding, which is typically made of a low-index polymer such as acrylate. The role of the low-index outer cladding is to reliably confine the pump light in the pump cladding under the temperature conditions experienced during operation of the device. However, the material entering in the composition of the low-index outer cladding is generally not well adapted to withstand the heat generated therein or thereabout upon removal of the residual pump power. For example, the maximum operating temperature of acrylate is around 85 degrees Celsius (° C.), which can be well below the localized temperature reached at the junction between the low and high-index outer claddings as a result of light stripping. Therefore, structural and optical degradation of the low-index outer cladding may occur.

In light of the above, there therefore remains a need in the art for a light stripper operative to effectively dissipate a residual power carried by a pump light propagating in an optical fiber component in a manner that reduces the heat load and associated thermal degradation sustained by the low-index outer cladding of the optical fiber component.

SUMMARY OF THE INVENTION

According to an aspect of the invention, there is provided a light stripper assembly for dissipating a residual optical pump power carried by a pump light propagating in an optical fiber component. The optical fiber component includes a core, a pump cladding guiding the pump light thereinside and surrounding the core, and an outer cladding surrounding the pump cladding, the outer cladding being removed from the optical fiber component along a lengthwise segment thereof. The light stripper assembly includes:

a pump stripper disposed about the lengthwise segment of the optical fiber component. The pump stripper includes:
   an input guiding region made of a material having a refractive index lower than a refractive index of an outermost periphery of the pump cladding, so that the pump light continues to be guided inside the pump cladding along a portion of the pump stripper; and
   a stripping region adjacent to and downstream of the input guiding region, the stripping region being made of a material having a refractive index higher than the refractive index of the outermost periphery of the pump cladding, the stripping region stripping the residual optical pump power from the pump cladding; and
a heat-dissipation packaging structure in thermal contact with the pump stripper, the heat-dissipation packaging structure absorbing and dissipating the residual optical pump power stripped by the stripping region of the pump stripper.

Advantageously, embodiments according to this aspect of the invention may be useful for removing unwanted pump light from cladding-pumped optical fibers, such as in fiber lasers and amplifiers. Preferably, the removal of this unwanted pump light is performed in a manner that limits the heat load and thermal degradation sustained by the low-index outer cladding of the cladding-pumped optical fibers, which is typically made of a material that degrades at a relatively low temperature. More particularly, embodiments of the invention generally involve displacing the point or region of the pump stripper where the residual optical pump power is removed from the pump cladding away from the low-index outer cladding of the optical fiber component. This can be achieved by providing a dual-index pump stripper defining is successive guiding and stripping regions.

Preferably, the material of each of the input guiding region and the stripping region of the pump stripper includes a silicone elastomeric material, an epoxy-based material or a silicone gel-based material.

In some embodiments, the material of each of the input guiding region and the stripping region of the pump stripper is optically transparent at the wavelength of the pump light.

In some embodiments, the material of each of the input guiding region and the stripping region of the pump stripper is a heat-resistant material adapted to withstand heat generated upon stripping and absorption of the residual optical pump power from the pump cladding.

In some embodiments, the material of each of the input guiding region and the stripping region of the pump stripper is made of a low-hardness material, for example, a material having a hardness of less than 90 Shore D on the durometer scale.

In some embodiments, the pump stripper may further include an output guiding region adjacent to and downstream of the stripping region. The output guiding region is made of a material having a refractive index lower than a refractive index of an outermost periphery of the pump cladding, so that unabsorbed pump light exiting the stripping region is guided inside the pump cladding along the output guiding region.

In some embodiments, the heat-dissipation packaging structure may include an input port and an output port through which the optical fiber component enters in and exits from the heat-dissipation packaging structure, respectively, and an inner surface defining a cavity extending between the input and output ports. The cavity is is preferably sized and shaped for receiving thereinside the lengthwise segment of the optical fiber component and the pump stripper disposed thereabout.

Other features and advantages of embodiments of the present invention will be better understood upon reading of preferred embodiments thereof with reference to the appended drawings.

BRIEF DESCRIPTION OF THE DRAWINGS

FIG. 5 is a side elevation view of the light stripper assembly of FIG. 1.

FIG. 6 is a cross-sectional top view of FIG. 5, taken along section line 5. FIGS. 6A to 6D are enlargements of some portions of FIG. 6 depicting the propagation of the signal and pump lights in the optical fiber component upon entering, propagating through and exiting the light stripper assembly, in accordance with an embodiment. It is to be noted that although FIGS. 6A to 6D show cross-sectional views, hatchings have been partially omitted to provide clarity to the figures.

FIG. 8 is a side elevation view of the light stripper assembly of FIG. 7.

FIG. 9 is a cross-sectional top view of FIG. 8, taken along section line 9. FIGS. 9A to 9D are enlargements of some portions of FIG. 9 depicting the propagation of the signal and pump lights in the optical fiber component upon entering, propagating through and exiting the light stripper assembly, in accordance with an embodiment. It is to be noted that although FIGS. 9A to 9D show cross-sectional views, hatchings have been partially omitted to provide clarity to the figures.

DESCRIPTION OF PREFERRED EMBODIMENTS OF THE INVENTION

Figure 1:
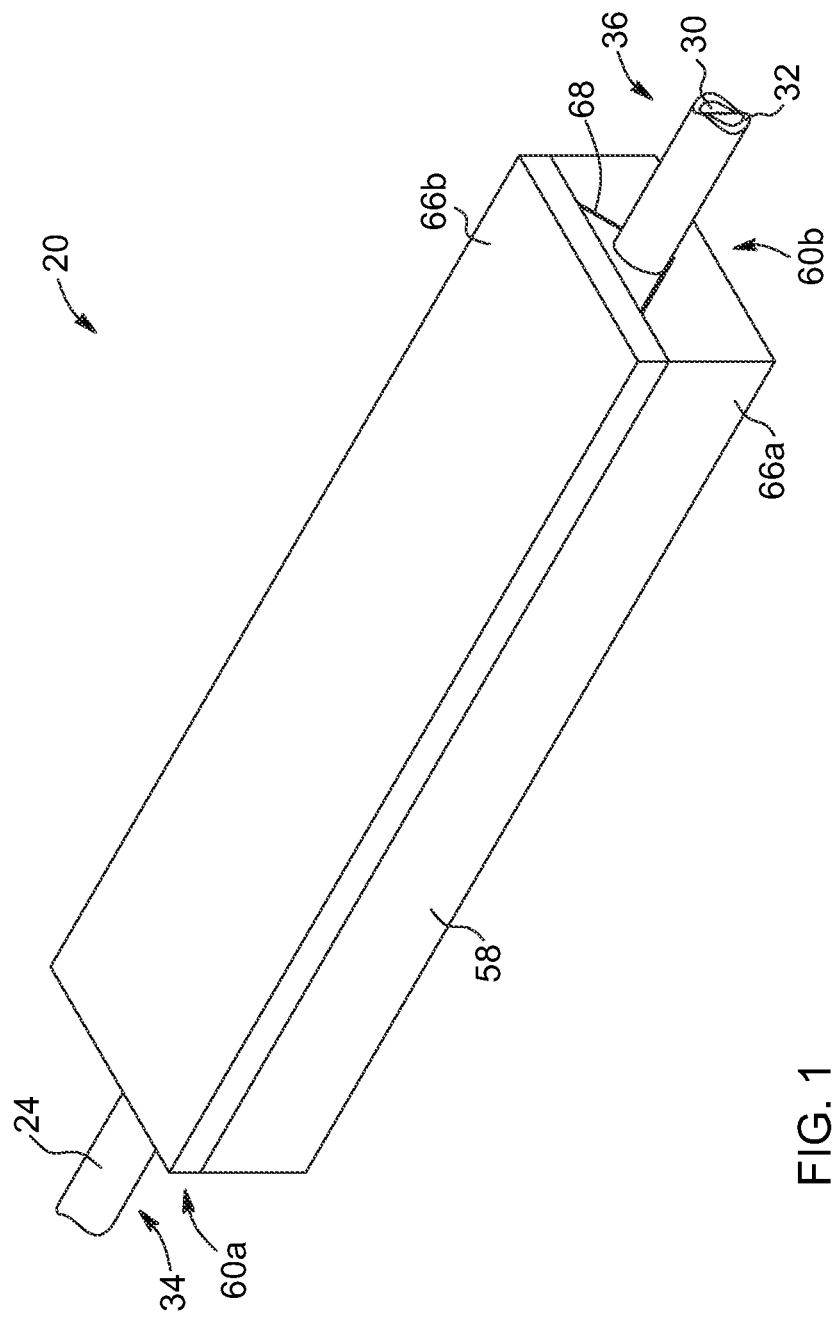
FIG. 1 is a schematic perspective side view of a light stripper assembly, in accordance with an embodiment.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

In accordance with an aspect of the invention, there is provided a light stripper assembly for dissipating a residual optical pump power carried by a pump light propagating in an optical fiber component.

In some embodiments, the light stripper assembly may be configured as an integral component of a high-power fiber laser or amplifier system based on cladding-pumped optical fibers such as, for example, a fiber-based master oscillator power amplifier (MOPA) system. Such high-power fiber laser or amplifier systems typically include a fiber gain medium pumped by a pump light at a pump wavelength and generating a light signal at a signal wavelength in response thereto.

Embodiments of the present invention may be particularly useful in any application where it is desired to remove unwanted pump light from cladding-pumped optical fibers, such as in fiber lasers and amplifiers, in a manner that limits the heat load and thermal degradation sustained by the low-index outer cladding of the cladding-pumped optical fibers.

To this end, and as will be described in greater detail below, the light stripper assembly according to embodiments of the invention generally includes a dual-index pump stripper defining successive guiding and stripping regions, and a heat-dissipation packaging structure in thermal contact with the pump stripper. The guiding region allows guiding unwanted pump light away from the low-index outer cladding and into the stripping region, where the residual optical pump power is stripped from the pump cladding and absorbed and dissipated by the heat-dissipation packaging structure. More particularly, embodiments of the invention generally involve displacing the point or region of the pump stripper where the residual optical pump power is removed from the pump cladding away from the low-index outer cladding of the cladding-pumped optical fiber.

Referring now to FIGS. 1 to 6, an embodiment of a light stripper assembly 20 for dissipating the residual power carried by a pump light 22 propagating in an optical fiber component 24 is shown.

Throughout the present description, the term "pump stripping" and variants thereof generally refers to any method by which light propagating in the pump or inner cladding of a cladding-pumped optical fiber component is removed from the pump cladding. More specifically, the light stripper assembly according to embodiments of the invention is operatively configured to dissipate, absorb, redirect, radiate away or otherwise remove residual optical pump power from the pump cladding of an optical fiber component. It is to be noted that, as used herein, the terms "pump cladding" and "inner cladding" are used interchangeably to refer to the cladding of the optical fiber component that guides the pump light thereinside and that surrounds the core.

As used herein, the term "residual optical pump power" is intended to refer to any unwanted pump light propagating in the pump cladding of an optical fiber component. For example, the residual optical pump power may include unabsorbed optical pump power propagating past a fiber gain medium whose removal is desirable to prevent or limit structural or optical degradation of optical components downstream of the fiber gain medium. Alternatively, the residual optical pump power to be removed by the light stripper assembly may include light signal that has been transferred from the core to the pump cladding through bending of the fiber (i.e. higher-order modes filtering), or spontaneous emission generated in the doped core and captured by the to pump cladding.

Furthermore, it will be understood that, as used herein, the terms "light" and "optical" refer to electromagnetic radiation in any appropriate region of the electromagnetic spectrum and are not limited to visible light. For example, in embodiments of the invention for use in high-power fiber laser and amplifier systems, the term "light" and "optical" may for example encompass electromagnetic radiation with a wavelength included in a range from about 900 nm to 2 micrometers (μm). However, some types of optical fibers have demonstrated guiding properties at optical wavelengths ranging from about 200 nm (deep ultraviolet) to 8 μm (mid-infrared).

Optical Fiber Component

Figure 4A:
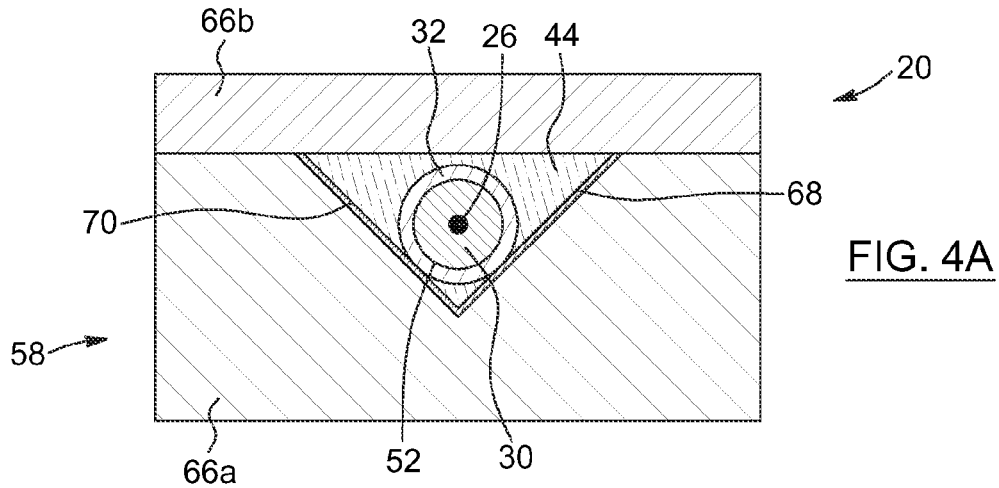
FIGS. 4A to 4C are cross-sectional side elevation views of FIG. 3, taken along section lines 4A to 4C, respectively.

Referring more specifically to FIGS. 4A and 6A, the optical fiber component 24 includes a core 26 guiding the light signal 28 thereinside, a pump cladding 30 guiding the pump light 22 thereinside and surrounding the core 26, and an outer cladding 32 surrounding the pump cladding 30.

The term "optical fiber component" generally refers herein to a cladding-pumped optical fiber component made into a multi-clad structure such as a double-clad structure or a triple-clad structure, in which one or more successive cladding layers are provided radially between a core and an outer cladding. The optical fiber component may include, without being limited to, an active optical fiber providing a gain medium pumped by a pump light and used to amplify a light signal to a desired level, a passive optical fiber used to deliver light from and to an active optical fiber, splice between optical fibers, a fiber Bragg grating, a fiber taper, a signal and pump combiner such as a tapered fiber bundle, a fiber coupler, or the like, or a combination thereof.

In the embodiment of FIGS. 1 to 6, the optical fiber component 24 consists of an active double-clad fiber 34 spliced to a passive double-clad fiber 36 at a splice junction 38 formed therebetween. As known in the art, the splice junction 38 may, but need not, be a fusion splice, which can be achieved by applying localized heat sufficient to fuse the respective ends of the active and passive fibers 34 and 36. As will be apparent from the discussion below, the light stripper assembly 20 may be disposed about the optical fiber component such as to extend over the splice junction 38

The active fiber 34 is disposed upstream of the passive fiber 36 and defines a fiber gain medium in which a light signal 28 at a signal wavelength is amplified. A schematic ray-trace representation of the propagations of the light signal 28 and pump light 22 inside the core 26 and the pump cladding 30, respectively, is shown in FIG. 6A. As will be discussed below, the light stripper assembly 20 is operative to dissipate the residual optical pump power unabsorbed during the amplification process within the gain medium of the active fiber 34, and to output the light signal 28 into the passive fiber 36 for propagation therealong, as shown in FIG. 6D.

The core 26, pump cladding 30 and outer cladding 32 are made of materials with different refractive indices, which are selected so that the light signal 28 and the pump light 22 are respectively guided inside the core 26 and inside the pump cladding 30 by total internal reflection. This can be achieved when the pump cladding 30 has a refractive index lower than the index of the core 26, but higher than the refractive index of the outer cladding 32.

It will also be understood that in embodiments where the refractive index of the pump cladding 30 is allowed to vary radially from the inner to the outer diameter thereof, the refractive index at the innermost periphery of the pump cladding 30 is lower than the index of the core 26 while being higher than the refractive index of the outer cladding 32.

The core 26 and the pump cladding 30 may be made of silica glasses having different refractive indices. In the gain region of the optical fiber component 24, that is, along the active fiber 34, the core 26 may be doped with a laser-active dopant material, for example a rare earth such as Yb, Er or Tm. The outer cladding 32 may be made of a low-index polymer such as, for example, acrylic. In some embodiments, the refractive indices of the core 26, pump cladding 30 and outer cladding 32 may be selected so that the numerical aperture of the core ranges from about 0.03 to 0.3 and the numerical aperture of the pump cladding 30 ranges from about 0.1 to 0.6. In the embodiment illustrated in FIGS. 1 to 6, the refractive indices of the core 26, pump cladding 30 and outer cladding are equal to 1.4612, 1.46 and 1.36, respectively (see, e.g., FIG. 10). Of course, other materials and refractive index values may be used for the core 26, pump cladding 30 and outer cladding 32 without departing from the scope of the invention. It will also be understood that while, in the illustrated embodiment, the core 26, pump cladding 30 and outer cladding 32 may be arranged in a concentric circular manner, this need not be the case in other embodiments. In particular, designs with a lower symmetry, including an off-centered core or a non-circular pump cladding, may be envisioned.

Referring more specifically to FIGS. 2, 4B, 4C and 6, in embodiments of the present invention, the outer cladding 32 is removed from the optical fiber component 24 along a lengthwise segment 40 thereof, thereby exposing the pump cladding 30. In the illustrated embodiment, the lengthwise segment 40 extends substantially equally on both sides of the splice junction 38 that joins the active fiber 34 to the passive fiber 36, but the disposition of the lengthwise segment 40 may be varied in alternative embodiments.

It will be understood that the outer cladding 32 may be removed from the lengthwise segment 40 of the optical fiber component 24 using any appropriate method, including mechanical stripping, thermal stripping and chemical stripping. It will also be understood that the lengthwise segment 40 of the optical fiber component 24 may be from about 1 to 30 centimeters (cm) in length, depending on the intended performance and design requirements of a particular application. However, it is to be understood that these dimensions are given for purposes of illustration only and that they are not to be construed as limiting the scope of the present invention.

Pump Stripper

Referring back to FIGS. 1 to 6, the light stripper assembly 20 includes a pump stripper 42 disposed about the lengthwise segment 40 of the optical fiber component 24.

Figure 2:
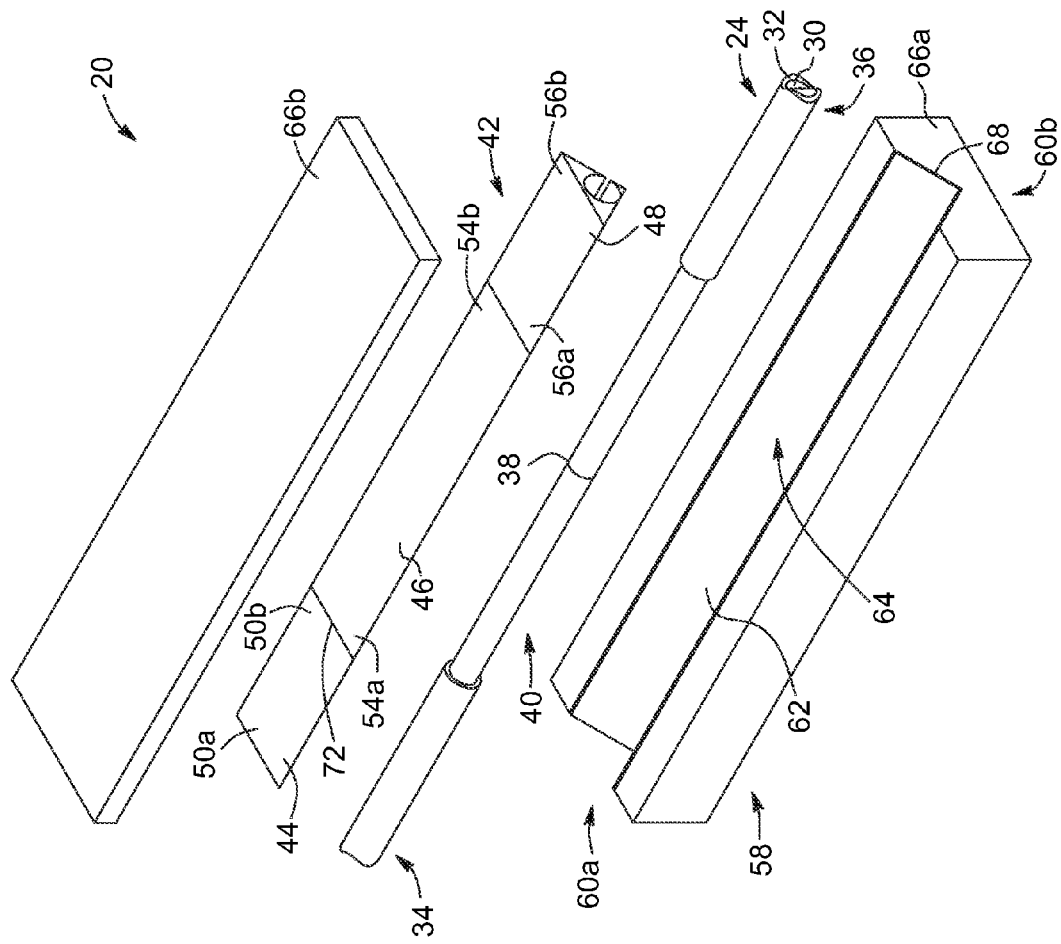
FIG. 2 is a partially exploded view of FIG. 1, depicting the removal of the cover of the heat-dissipation packaging structure from the base thereof and of the pump stripper disposed about the lengthwise segment of the optical fiber component.
Figure 3:
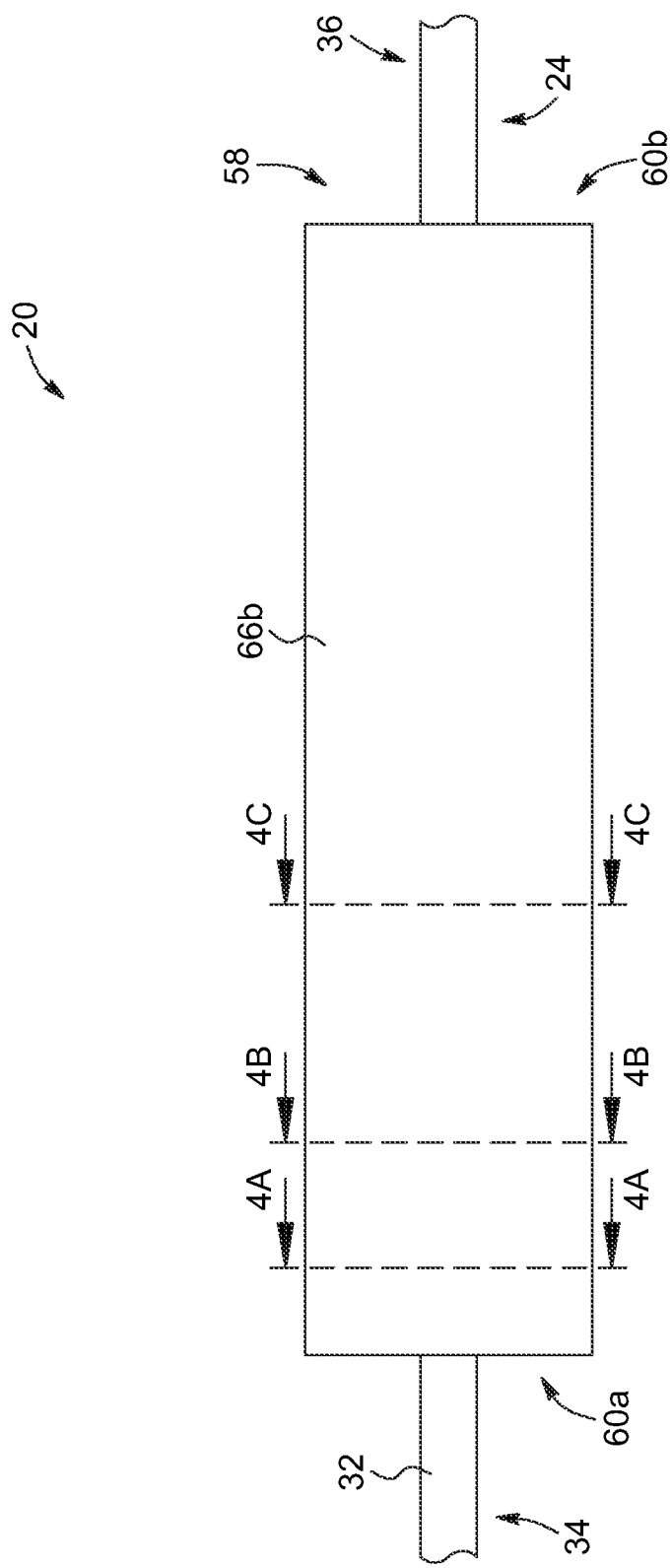
FIG. 3 is a top plan view of the light stripper assembly of FIG. 1.
Figure 4B:
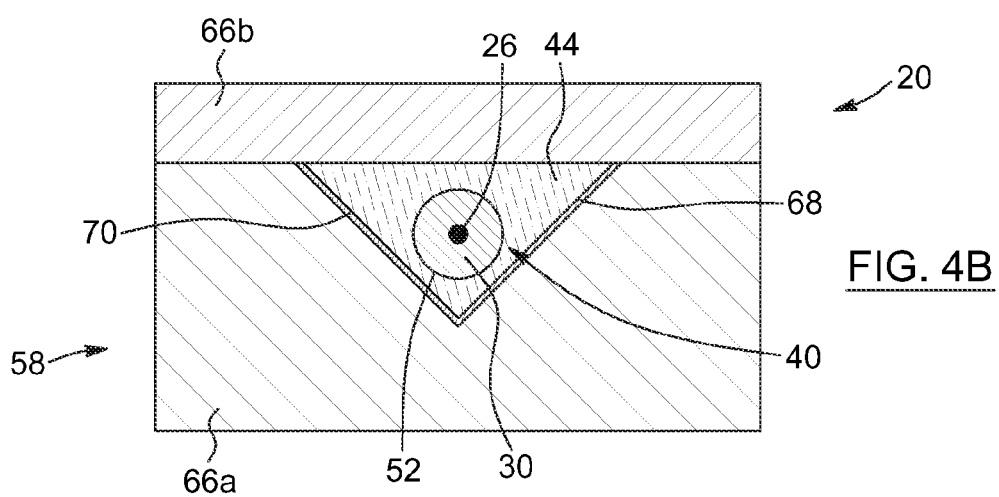
Figure 4C:
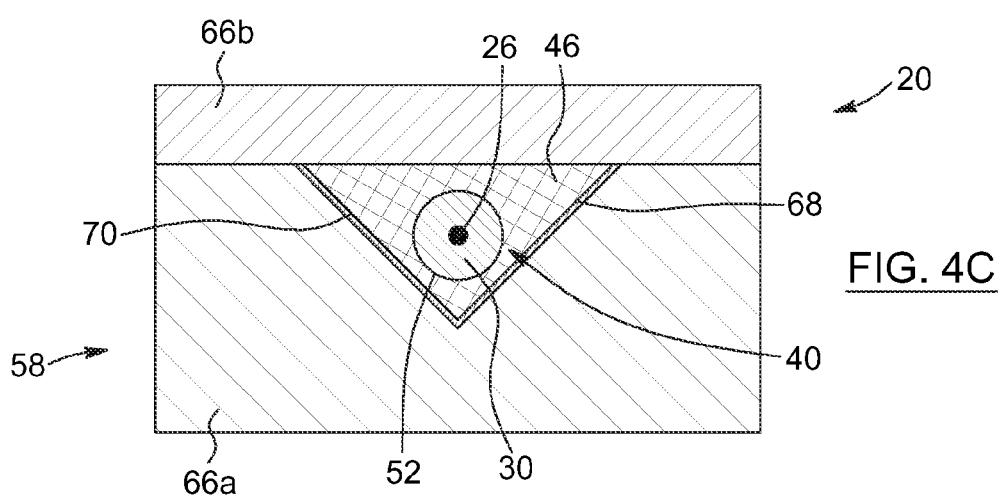

As illustrated in FIGS. 2, 4B and 4C, the pump stripper 42 preferably surrounds the entire peripheral surface of the exposed lengthwise segment 40 of the optical fiber component 24. Furthermore, the pump stripper 42 may, but need not, extend endwise beyond the lengthwise segment 40, so as to also cover a small portion of the outer cladding 32 of the optical fiber component 24 on either or both active and passive sides thereof.

Broadly described, the pump stripper 42 corresponds to the element of the light stripper assembly 20 that initially causes the pump light 22 unabsorbed by the fiber gain medium provided in the active fiber 34 of the optical fiber component 24 to continue to be guided over a certain distance into the pump stripper 42, and that subsequently removes the residual optical pump light 22 from the pump cladding 30. Advantageously, the removal of this residual optical pump power occurs in a region of the pump stripper 42 that is sufficiently distant from the outer cladding 32 of the optical fiber component 24 to reduce the risk of thermally degrading the outer cladding 32. As will be described in greater detail below, this achieved by the use of a dual-index pump stripper 42 including successive guiding and stripping regions.

As shown more specifically in FIGS. 2 and 6, the dual-index pump stripper 42 includes successively an input guiding region 44, a stripping region 46 and, optionally, an output guiding region 48. Each of these regions will be described in greater detail below.

Input Guiding Region

The dual-index pump stripper 42 first includes an input guiding region 44. As shown in the embodiment of FIGS. 1 to 6, the input guiding region 44 includes an input end 50a physically contacting and slightly extending over the outer cladding 32 of the active fiber 34 and an output end 50b physically contacting the stripping region 46 of the pump stripper 42. The input guiding region 44 acts as a waveguide for the unabsorbed pump light 22, as shown in FIG. 6B. More specifically, a role of the input guiding region 44 is to allow the unabsorbed pump light 22 to continue be guided inside the pump cladding 30 along a portion of the pump stripper 42 before being removed from the pump cladding 30. The provision of the input guiding region 44 is to ensure that the point along the lengthwise segment 40 where the removal of the pump light 22 begins to occur is sufficiently distant from the outer cladding 32 to avoid or at least mitigate any thermal degradation of the outer cladding 32. For example, in some embodiments, the input guiding region 44 may be between about 1 mm and 5 cm long. However, other dimensions may be used in other embodiments without departing from the scope of the invention.

Figure 10:
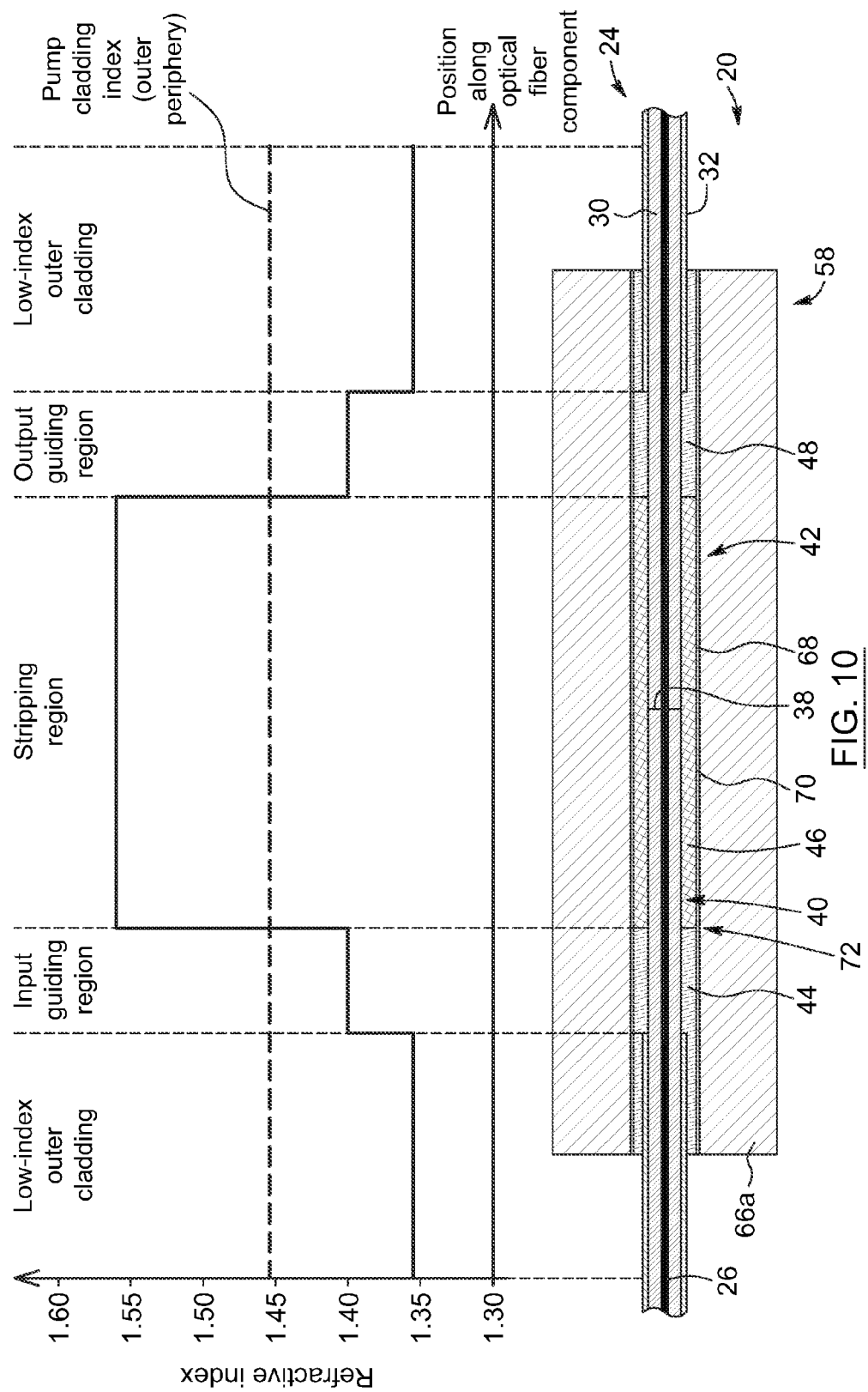
FIG. 10 is a schematic representation of the refractive index of the material in contact with the pump cladding as a function of the axial position along the optical fiber component, for the light stripping assembly of FIG. 1. The value of the refractive index at the outermost periphery of the pump cladding is indicated by the horizontal dashed line for comparison purposes.

In order to ensure that the pump light 22 is at least partially guided inside the pump cladding 30 along the input guiding region 44, the input guiding region 44 is made of a material having a refractive index lower than the refractive index of the outermost periphery 52 of the pump cladding 30, by a selected amount preferably equal to at least 0.005. For example, in the illustrated embodiment, the material of the input guiding region 44 has a refractive index equal to 1.40 while the outermost periphery 52 of the pump cladding 30 has a refractive index equal to 1.46, as shown in FIG. 10.

Stripping Region

Figure 7:
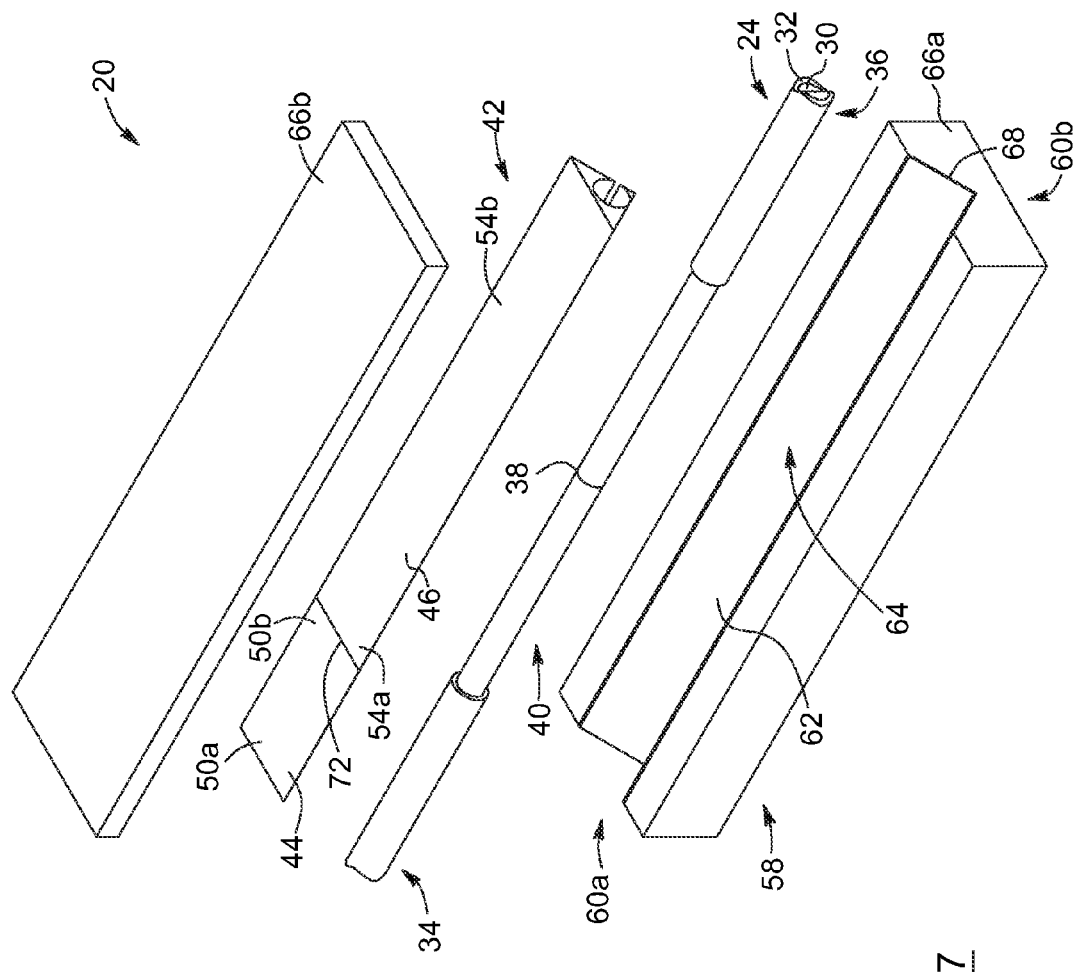
FIG. 7 is a partially exploded view of a light stripper assembly, in accordance with another embodiment of the invention, depicting the removal of the cover of the heat-dissipation packaging structure from the base thereof and of the pump stripper disposed about the lengthwise segment of the optical fiber component.

The dual-index pump stripper 42 also includes a stripping region 46 adjacent to and downstream of the input guiding region 44. As shown in the embodiment of FIGS. 1 to 6, the stripping region 46 includes an input end 54a physically contacting the output end 50b of the input guiding region 44 and an output end 54b physically contacting the output guiding region 48. However, in other embodiments, such as those shown in FIGS. 7 to 9, the pump stripper 42 may not include an output guiding region 48, as discussed further below. In such cases, the output end 54b of the stripping region 46 may establish physical contact with the outer cladding 32 of the passive fiber 36 of the optical fiber component 24.

The role of the stripping region 46 is to remove the unabsorbed pump light 22 from the pump cladding 30, as shown in FIG. 6C. In order to achieve this goal, the stripping region 46 is made of a material having a refractive index higher than the refractive index of the outermost periphery 52 of the pump cladding 30. As mentioned above in regard to the refractive index of the input guiding region 44, in order to ensure efficient removal of the unabsorbed pump light 22 from the pump cladding 30, the refractive index of the stripping region 46 may be higher than the refractive index of the outermost periphery 52 of the pump cladding 30, by a selected amount preferably equal to at least 0.005. For example, in the embodiment shown in FIG. 10, the stripping region 46 has a refractive index equal to 1.57 while the outermost periphery 52 of the pump cladding 30 has a refractive index equal to 1.46. The length of the stripping region 46 is preferably selected to achieve a desired level of pump stripping. For example, in some embodiments, the stripping region 46 may be between about 1 cm and 30 cm in length. Again, these dimensions are given for purposes of illustration only and are not to be construed as limiting.

In this regard, it will be understood that while increasing the difference between the refractive indices of the stripping region 46 and the outermost periphery 52 of the pump cladding 30 improves the pump stripping efficiency and reduces the stripping length, it also leads to a higher temperature rise near the point or region along the pump cladding where pump stripping begins, which is referred to herein as the stripping initiation point 72. For example, in FIG. 2, the stripping initiation point 72 is located at the interface between the output end 50b of the input guiding region 44 and the input end 54a of the stripping region 46. Therefore, embodiments of the invention advantageously displace the stripping initiation point 72 of the pump stripper 42, where the residual optical pump power is removed from the pump cladding 30, away from the low-index outer cladding 32 of the optical fiber component 24. This displacement of the stripping initiation point 72 can allow for the stripping region 46 to be shortened and the efficiency of the pump stripping process to be increased while at the same time minimizing the risk of thermally degrading the heat-sensitive low-index outer cladding 32.

Material Properties of the Input Guiding and Stripping Regions

Referring to FIGS. 1 to 6, in some embodiments, it may desirable that the materials of the input guiding region 44 and stripping region 46 of the dual-index pump stripper 42 have specific properties. Some of these desirable properties are discussed below.

Firstly, in some embodiments, it is considered desirable that the material of each of the input guiding region 44 and the stripping region 46 be optically transparent at the wavelength of the pump light 22 to be stripped. Preferably, the optical transmittance of both materials is the highest possible, for example, at least 98 percent per millimeter length at the wavelength of the pump light 22. In this regard, it will be to understood that the optical transparency of the stripping region 46 can prevent significant absorption of the stripped pump light 22 by the material of the stripping region 46 and thus overheating in the stripping region 46.

It may also be desirable that the input guiding region 44 and the stripping region 46 be made of a material having suitable thermal properties such as, for example, a high degradation temperature, a high melting point and a high specific heat capacity. Preferably, these materials are heat-resistant materials adapted to withstand the heat generated upon stripping and absorption of the residual optical pump power from the pump cladding 30. More specifically, the material of each of the input guiding region 44 and the stripping region 46 preferably do not degrade even at temperatures significantly higher that the temperatures at which more conventional materials entering in the composition of optical fiber outer cladding generally start to degrade. For example, low-index polymers, such as acrylate, generally start to degrade at about between 70 and 100° C. Preferably, the material of each of the input guiding region 44 and the stripping region 46 is adapted to withstand exposure to temperatures of at least 200° C.

Furthermore, it may be advantageous that the material of each of the input guiding region 44 and the stripping region 46 be a low-hardness material to limit the level of mechanical stress imposed on the optical fiber component 24 either during the fabrication (e.g. due to heat curing or ultraviolet curing) or the operation (e.g. due to thermal expansion) of the light stripper assembly 20. For example, in some embodiments, the material of each of the input guiding region 44 and the stripping region 46 has a hardness of less than 90 Shore D on the durometer scale.

As one of ordinary skill in the art will understand, a low-hardness material may be particularly desirable to help preserving beam quality and modal content of the light propagating in large mode area (LMA) fibers having a large core area and low numerical aperture, which can be particularly sensitive to mechanical stress. It will also be understood that mechanical stress on the optical fiber component 24 may have a deleterious impact on the optical properties of the light signal 28 propagating therealong (e.g. degradation of beam quality and degree of polarization). Moreover, repeated mechanical stress or mechanical aging may eventually break the silica glass making up the optical fiber component 24, which can in turn lead to a catastrophic failure of the light stripper assembly 20.

Examples of materials that can be used to form the input guiding region 44 and the stripping region 46 of the pump stripper 42 and that can exhibit one or more of the foregoing optical, thermal and mechanical properties include, without being limited to, silicone elastomeric materials, epoxy-based materials and silicone gel-based materials.

Output Guiding Region

In the embodiment shown in FIGS. 1 to 6, the dual-index pump stripper 40 further includes an optional output guiding region 48 adjacent to and downstream of the stripping region 46. The output guiding region 48 includes an input end 56a physically contacting with the output end 54b of the stripping region 46 and an output end 56b physically contacting with and slightly extending over the outer cladding 32 of the passive fiber 36.

As for the input guiding region 44 described above, the output guiding region 48 is made of a material having a refractive index lower than the refractive index at the outermost periphery 52 of the pump cladding 30, so that unabsorbed pump light 22 exiting the stripping region 46 is guided inside the pump cladding 30 along the output guiding region 48. For example, in the embodiment of FIG. 10, the output guiding region 48 has a refractive index equal to 1.40, while the outermost periphery 52 of the pump cladding 30 has a refractive index equal to 1.46. It will also be understood that, as for the material of the input guiding and stripping regions 44 and 46, the material of the output guiding region 48 may include, without being limited to, silicone elastomeric materials, epoxy-based materials and silicone gel-based materials, and may exhibit one or more of the optical, thermal and mechanical properties described above.

A role of the output guiding region 48 is to ensure that the pump light 22 that has not been removed by the stripping region 46 travels a certain distance away from the stripping region 46 before beginning to be guided again by the pump cladding 30 surrounded by the outer cladding 32 upon exiting the light stripper assembly 20. By virtue of this configuration, the outer cladding 32 and the stripping region 46 are sufficiently distant from each other to avoid, or at least mitigate, overheating and thermal degradation of the outer cladding 32 that could result from the heat generated in the vicinity of the stripping region 46 during the pump power removal process.

It will be understood, however, that the provision of the output guiding region 48 remains optional in the pump stripper 42 of the embodiments of the invention. For example, as mentioned above in connection with the embodiment shown in FIG. 9, the pump stripper 42 may not include an output guiding region 48, so that the output end 54b of the stripping region 46 establishes direct physical contact with the outer cladding 32 of the passive fiber 36. In this regard, FIGS. 9A to 9D depict, similarly to FIGS. 6A to 6D discussed above, the propagation of the signal and pump lights in the optical fiber component 24 upon entering, propagating through and exiting the embodiments of the light stripper assembly 20 of FIG. 9. More specifically, it is seen that the pump light 22 enters the light stripper assembly 20 (FIG. 9A), is guided inside the pump cladding 30 along the input guiding region 44 (FIG. 9B) and is stripped from the pump cladding 30 in the stripping region 46 (FIG. 9C), so that only the light signal 28 and a small portion of the pump light 22 (depicted by the thinner ray traces in FIG. 9D) remain in the optical fiber component 24 downstream of the light stripper assembly 20 (FIG. 9D).

Heat-Dissipation Packaging Structure

Referring back to FIGS. 1 to 6, the light stripper assembly 20 also includes a heat-dissipation packaging structure 58 in thermal contact with the pump stripper 42. As used herein, the term "thermal contact" generally means that heat conduction occurs directly or indirectly between two components, that is, the two components may be in direct contact with each other or may have a material having sufficient thermal conduction provided between them.

The heat-dissipation packaging structure 58 absorbs the residual optical pump power stripped by the stripping region 46 of the pump stripper 42 and dissipates the heat generated by the absorption process. More specifically, the thermal contact established between the heat-dissipation packaging structure 58 and the pump stripper 42 facilitates the dissipation and absorption by the former of the residual optical pump power stripped by the latter from the pump cladding 30.

In some embodiments, such as shown in FIGS. 1 to 6, the heat-dissipation packaging structure 58 may accommodate, house or otherwise mechanically support the pump stripper 42 disposed about the optical fiber component 24. However, it will be understood that in other embodiments, the heat-dissipation packaging structure 58 need not to completely surround the pump stripper 42.

In the embodiment of FIGS. 1 to 6, the heat-dissipation packaging structure 58 includes an input port 60a and an output port 60b through which the optical fiber component 24 enters in and exits from the heat-dissipation packaging structure 58, respectively. The heat-dissipation packaging structure 58 also includes an inner surface 62 defining a cavity 64 extending between the input and output ports 60a, 60b. The cavity 64 is sized and shaped for receiving thereinside the lengthwise segment 40 of the optical fiber component 24 and the pump stripper 42 disposed thereabout. The heat-dissipation packaging structure 58 further includes a is base 66a and a mating cover 66b. In the illustrated embodiment, the cavity 64 is a V-groove machined in a top portion of the base 66a of the heat-dissipation packaging structure 58 and the optical fiber component 24 with the pump stripper 42 disposed thereabout is received snuggly in the cavity 64. It will be understood, however, that this particular geometry for the heat-dissipation packaging structure 58 is shown for illustration purposes only and should not be construed as limiting the scope of the invention.

The heat-dissipation packaging structure 58 can be made of a material having a good thermal conductivity to favor better dissipation of the heat generated upon removal of the residual optical pump power from the pump cladding 30. For example, the heat-dissipation packaging structure 58 may have a thermal conductivity of, for example, at least 15 watts per meter-kelvin. The heat-dissipation packaging structure 58 may be made of a metal, a metallic alloy, a ceramic material, or of any combination of these materials.

In some embodiments, the light stripper assembly 20 may further include a surface coating 68 disposed on the inner surface 62 of the heat-dissipation packaging structure 58. The surface coating 68 contacts with at least a portion of an outermost periphery 70 of the stripping region 46 of the pump stripper 42. The surface coating 68 is made of a material having an optical absorption capability so as to provide and facilitate absorption and dissipation of the stripped residual optical pump power. The material of the surface coating 68 may include an anodizing black oxide coating, a chromate coating and a zinc coating, or a powder coating. However, other suitable materials may be used without departing from the scope of the invention.

Of course, numerous modifications could be made to the embodiments described above without departing from the scope of the present invention.

The invention claimed is:

1. A light stripper assembly for dissipating a residual optical pump power carried by a pump light propagating an optical fiber component, the optical fiber component comprising a core, a pump cladding guiding the pump light thereinside and surrounding the core, and an outer cladding surrounding the pump cladding, the outer cladding being removed from the optical fiber component along a lengthwise segment thereof, the light stripper assembly comprising: an input guiding region made of a material having a refractive index lower than a refractive index of an outermost periphery of the pump cladding, so that the pump light continues to be guided inside the pump cladding along a portion of the pump stripper; and a stripping region adjacent to and downstream of the input guiding region, the stripping region being made of a material having a refractive index higher than the refractive index of the outermost periphery of the pump cladding, the stripping region stripping the residual optical pump power from the pump cladding; and a heat-dissipation packaging structure in thermal contact with the pump stripper, the heat-dissipation packaging structure in thermal contact with the pump stripper, the heat-dissipation packaging structure absorbing and dissipating the residual optical pump power stripped by the stripping region of the pump stripper, wherein the material of each of the input guiding region and the stripping region of the pump stripper is a heat-resistant material adapted to withstand heat generated upon stripping and absorption of the residual optical pump power from the pump cladding, wherein the material of each of the input guiding region and the stripping region of the pump stripper is adapted to withstand exposure to temperatures of at least 200° C.

2. The light stripper assembly according to claim 1, wherein the material of each of the input guiding region and the stripping region of the pump stripper is an optically transparent material at a wavelength of the pump light.

3. The light stripper assembly according to claim 2, wherein the material of each of the input guiding region and the stripping region of the pump stripper has an optical transmittance of at least 98 percent per millimeter length at the wavelength of the pump light.

4. The light stripper assembly according to claim 1, wherein the refractive index of the material of the input guiding region is lower than the refractive index of the outermost periphery of the pump cladding by a selected amount, said selected amount being at least 0.005.

5. The light stripper assembly according to claim 1, wherein the refractive index of the material of the stripping region is higher than the refractive index of the outermost periphery of the pump cladding by a selected amount, said selected amount being at least 0.005.

6. The light stripper assembly according to claim 1, wherein the material of each of the input guiding region and the stripping region of the pump stripper comprises one of a silicone elastomeric material, an epoxy-based material and a silicone gel-based material.

7. The light stripper assembly according to claim 1, wherein the material of each of the input guiding region and the stripping region of the pump stripper has a hardness of less than 90 Shore D.

8. The light stripper assembly according to claim 1, wherein the pump stripper further comprises an output guiding region adjacent to and downstream of the stripping region, the output guiding region being made of a material having a refractive index lower than a refractive index of an outermost periphery of the pump cladding, so that unabsorbed pump light exiting the stripping region is guided inside the pump cladding along the output guiding region.

9. The light stripper assembly according to claim 1, wherein the heat-dissipation packaging structure is made of a material comprising one of a metal, a metallic alloy, a ceramic material, and a combination thereof.

10. The light stripper assembly according to claim 9, wherein the material of the heat-dissipation packaging structure has a thermal conductivity of at least 15 watts per meter-kelvin.

11. The light stripper assembly according to claim 1, wherein the heat-dissipation packaging structure comprises:
    an input port and an output port through which the optical fiber component enters in and exits from the heat-dissipation packaging structure, respectively; and
    an inner surface defining a cavity extending between the input and output ports, the cavity being sized and shaped for receiving thereinside the lengthwise segment of the optical fiber component and the pump stripper disposed thereabout.

12. The light stripper assembly according to claim 11, further comprising a surface coating disposed on the inner surface of the heat-dissipation packaging structure and contacting with at least a portion of an outermost periphery of the stripping region of the pump stripper, the surface coating being made of a material having an optical absorption capability so as to provide absorption and dissipation of the residual optical pump power stripped by the stripping region of the pump stripper.

13. The light stripper assembly according to claim 12, wherein the material of the surface coating comprises one of an anodizing black oxide coating, a chromate coating and a zinc coating.

* * * * *